United States Patent Office 3,055,751
Patented Sept. 25, 1962

3,055,751
METHOD FOR COMBATTING WEEDS
Harry Tilles, El Cerrito, and Joe Antognini, Mountain View, Calif., assignors to Stauffer Chemical Company, a corporation of Delaware
No Drawing. Filed Nov. 24, 1958, Ser. No. 775,740
7 Claims. (Cl. 71—2.7)

This invention relates to certain alkoxy esters of N,N-alkyl and allyl thiolcarbamic acids, including cyclo alkyl substituted, halo-substituted alkyl and allyl carbamic acids as compositions of matter and as herbicides. This application is a continuation-in-part of our application Serial No. 655,482, filed April 29, 1957, now abandoned. More specifically, the invention relates to compounds which have the general formula:

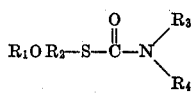

where $R_1$, $R_2$, $R_3$ and $R_4$ are preferably as follows:

| $R_1$ | $R_2$ | $R_3$ | $R_4$ | Code |
|---|---|---|---|---|
| CH₃ | CH₂ | C₂H₅ | C₂H₅ | (R-2220) |
| CH₃ | CH₂ | n—C₃H₇ | n—C₃H₇ | (R-2221) |
| CH₃ | CH₂ | CH₃ | n—C₄H₉ | (R-2222) |
| CH₃ | CH₂ | C₂H₅ | n—C₄H₉ | (R-2223) |
| CH₃ | CH₂ | CH₂=CHCH₂ | CH₂=CHCH₂ | (R-2249) |
| CH₃ | CH₂ | CH₂=CHCH₂ | n—C₃H₇ | (R-2250) |
| CH₃ | CH₂ | CH₂=CHCH₂ | C₂H₅ | (R-2251) |
| CH₃ | CH₂ | CH₂=CHCH₂ | CH₂=C(Cl)CH₂ | (R-2253) |
| CH₃ | CH₂ | n—C₄H₉ | n—C₄H₉ | (R-2254) |
| CH₃ | CH₂ | CH₂=C(Cl)CH₂ | n—C₃H₇ | (R-2255) |
| CH₃ | CH₂ | i—C₄H₉ | i—C₄H₉ | (R-2256) |
| C₂H₅ | CH₂CH₂ | C₂H₅ | C₂H₅ | (R-2686) |
| C₂H₅ | CH₂CH₂ | n—C₃H₇ | n—C₃H₇ | (R-2687) |
| C₂H₅ | CH₂CH₂ | CH₃ | n—C₄H₉ | (R-2862) |
| C₂H₅ | CH₂CH₂ | C₂H₅ | n—C₄H₉ | (R-2703) |
| C₂H₅ | CH₂CH₂ | CH₂=CHCH₂ | CH₂=CHCH₂ | (R-2858) |
| C₂H₅ | CH₂CH₂ | CH₂=CHCH₂ | n—C₃H₇ | (R-2863) |
| C₂H₅ | CH₂CH₂ | CH₂=C(CH₃)CH₂ | C₂H₅ | (R-2866) |
| C₂H₅ | CH₂CH₂ | CH₂=C(CH₃)CH₂ | CH₂=CHCH₂ | (R-2869) |
| C₂H₅ | CH₂CH₂ | CH₂=C(Cl)CH₂ | n—C₃H₇ | (R-2870) |
| C₂H₅ | CH₂CH₂ | CH₂=C(Cl)CH₂ | CH₂=CHCH₂ | (R-2871) |
| C₂H₅ | CH₂CH₂ | ClCH=CHCH₂ | n—C₃H₇ | (R-2872) |
| C₂H₅ | CH₂CH₂ | cyclohexyl | ethyl | (R-2873) |
| C₂H₅ | CH₂ | C₂H₅ | C₂H₅ | (R-2879) |
| C₂H₅ | CH₂ | n—C₃H₇ | n—C₃H₇ | (R-2883) |
| C₂H₅ | CH₂ | C₂H₅ | n—C₄H₉ | (R-2884) |
| C₂H₅ | CH₂ | n—C₃H₇ | n—C₄H₉ | (R-2898) |
| C₂H₅ | CH₂ | CH₂=CHCH₂ | CH₂=CHCH₂ | (R-2894) |
| C₂H₅ | CH₂ | i—C₄H₉ | CH₂=CHCH₂ | (R-2896) |

The novel compounds of the present invention may be made in accordance with the following non-limiting examples. Code numbers have been assigned to each compound and are used throughout the balance of the application.

Example I (R-2220)

A 500 cc. 4-neck flask was provided with stirrer, thermometer, condenser and gas inlet tube. A solution of 29.2 g. (0.40 mole) of diethylamine in 150 cc. of tertiary butyl alcohol solvent was charged to the flask and then 15 g. (0.25 mole) of carbonyl sulfide was bubbled into the amine solution with rapid stirring. It required 13 minutes to complete the addition and the temperature was maintained at 18–28° C. with ice cooling. 17.7 g. (0.22 mole) of chlorodimethyl ether was then added dropwise at 9–35° C. The mixture was then heated to reflux and 138 cc. of solvent was distilled. The residual slurry was cooled, diluted with 350 cc. of petroleum ether, B.P. 30–60° C., filtered, and the cake was washed with a little pet ether. The filtrate was concentrated on the steam bath and the residual liquid was then fractionally distilled through an 18 inch Podbielniak heli-grid fractional distillation column. There was obtained 17.4 g. (49.3 percent yield) of methoxymethyl N,N-diethylthiolcarbamate, B.P. (30 mm.) 136.5°–138.0° C., $n_D^{30}$ 1.4845.

Analysis.—Calculated for C₇H₁₅NO₂S: N=7.90 percent. Found: N=7.80 percent.

Example II (R-2221)

When the general procedure of Example I was repeated except 40.4 g. (0.40 mole) of di-n-propylamine, 17 g. (0.28 mole) of carbonyl sulfide, 17.7 g. (0.22 mole) of chlorodimethyl ether and 150 cc. of tertiary butyl alcohol solvent were employed, there was obtained 22.2 g. (54.2 percent yield) of methoxymethyl N,N-di-n-propylthiolcarbamate, B.P. (30 mm.) 153–156° C., $n_D^{30}$ 1.4788.

Analysis.—Calculated for C₉H₁₉NO₂S: N=6.83 percent. Found: N=6.71 percent.

Example III (R-2222)

A solution of 17.4 g. (0.20 mole) of N-methyl-n-butylamine and 20.2 g. (0.20 mole) of triethylamine in 350 cc. of petroleum ether, B.P. 30–60° C. was charged to the same apparatus described under Example I. 17 g. (0.28 mole) of carbonyl sulfide was then passed into the amine solution over an interval of 42 minutes at 22 to 3½° C. with ice cooling. The chlorodimethyl ether was then added in 12 minutes over a temperature range of 3–12° C. with ice cooling. The mixture was then filtered and the cake was washed with 2-50 cc. portions of petroleum ether. The combined filtrate was concentrated on the steam bath and the residual liquid was fractionally distilled. There was obtained 22.3 g. (58.5 percent yield) of methoxymethyl N-methyl - N-n-butylthiolcarbamate, B.P. (30 mm.) 155–156° C., $N_D^{30}$ 1.4828.

Analysis.—Calculated for C₈H₁₇NO₂S: N=7.33 percent. Found: N=7.24 percent.

Example IV (R-2223)

When the general procedure of Example III was repeated except 20.2 g. (0.20 mole) of N-ethyl-n-butylamine, 17 g. (0.28 mole) of carbonyl sulfide, 20.2 g. (0.20 mole) of triethylamine, 17.7 g. (0.22 mole) of chlorodimethyl ether and 350 cc. of petroleum ether, B.P. 30–60° C. solvent were employed, there was obtained 19.8 g. (48.3 percent yield) of methoxymethyl N-ethyl-N-n-butylthiolcarbamate, B.P. (15 mm.) 144.0°–144.2° C., $n_D^{30}$ 1.4795.

*Analysis.*—Calculated for $C_9H_{19}NO_2S$: N=6.83 percent. Found: N=6.74 percent.

Example V
(R-2249)

30.6 cc. (0.20 mole) of sodium dispersion in xylene and 150 cc. of ethylene glycol dimethyl ether solvent were charged to the same apparatus described under Example I. The apparatus had previously been flushed out with an inert gas such as argon. 19.8 g. (0.20 mole) of diallylamine was then added. 14.5 g. (0.24 mole) of carbonyl sulfide was then passed into the mixture over an interval of 15 minutes at a temperature range of 27°–42° C. with external cooling. The solution was then cooled to 2.5° C. and the chlorodimethyl ether was added in 13 minutes at 2.5°–7.5° C. with ice cooling. The reaction mixture was then stirred at 7.5° C.–14.5° C. for 10 minutes and then slowly heated to 63° C. over an interval of 35 minutes. It was maintained at 57°–63° C. for 12 minutes and then cooled to room temperature, filtered and the cake was washed with 2–25 cc. portions of petroleum ether, B.P. 30–60° C. The combined filtrate was then concentrated on the steam bath and the residual liquid was fractionally distilled. There was obtained 27.6 g. (68.8 percent yield) of methoxymethyl N,N-diallylthiolcarbamate, B.P. (4.5 mm.) 114.0–115.0° C., $n_D^{30}$ 1.5040.

*Analysis.*—Calculated for $C_9H_{15}NO_2S$: N=6.97 percent. Found: N=6.85 percent.

Example VI
(R-2250)

When the general procedure of Example III was repeated except that 12.0 g. (0.12 mole) of allyl-n-propylamine, 10 g. (0.17 mole) of carbonyl sulfide, 12.1 g. (0.12 mole) of triethylamine, 9.8 g. (0.12 mole) of chlorodimethyl ether and 350 cc. of petroleum ether solvent were employed, there was obtained 17.1 g. (70.1 percent yield) of methoxymethyl N-allyl-N-n-propylthiolcarbamate, B.P. (4.5 mm.) of 114.5°–115.5° C., $n_D^{30}$ 1.4912.

*Analysis.*—Calculated for $C_9H_{17}NO_2S$: N=6.89 percent. Found: N=6.72 percent.

Example VII
(R-2251)

When the general procedure of Example V was repeated except that 8.5 g. (0.10 mole) of allylethylamine, 6.5 g. (0.11 mole) of carbonyl sulfide, 15.3 cc. (0.10 mole) of sodium dispersion in xylene, 8.1 g. (0.10 mole) of chlorodimethyl ether and 150 cc. of ethylene glycol dimethyl ether solvent were employed, there was obtained 12.7 g. (67.4 percent yield) of methoxymethyl N-allyl-N-ethylthiolcarbamate, B.P. (30 mm.) 149.0°–149.2° C., $n_D^{20}$ 1.4951.

*Analysis.*—Calculated for $C_8H_{15}NO_2S$: N=7.41 percent. Found: N=7.34 percent.

Example VIII
(R-2253)

When the general procedure of Example III was repeated except that 13.2 g. (0.10 mole) of N-3-chloroallyl allylamine, 10 g. (0.17 mole) of carbonyl sulfide, 10.1 g. (0.10 mole) of triethylamine, 8.1 g. (0.10 mole) of chlorodimethyl ether and 350 cc. of petroleum ether, B.P. 30°–60° C. solvent were employed, there was obtained as a residual liquid after solvent evaporation 17.5 g. (74.2 percent yield) of methoxymethyl N-3-chloroallyl-N-allylthiolcarbamate, $n_D^{30}$ 1.5235. The product could not be distilled at 4.5 mm. without decomposition.

*Analysis.*—Calculated for $C_9H_{14}ClNO_2S$: Cl=15.1 percent; N=5.94 percent. Found: Cl=15.1 percent; N=5.98 percent.

Example IX
(R-2254)

When the general procedure of Example III was repeated except that 51.6 g. (0.40 mole) of di-n-butylamine, 16 g. (0.27 mole) of carbonyl sulfide, 16.1 g. (0.20 mole) of chlorodimethyl ether and 350 cc. of petroleum ether, B.P. 30°–60° C. solvent were employed, there was obtained 34.4 g. (73.7 percent yield) of methoxymethyl N,N-di-n-butylthiolcarbamate, B.P. (4.6 mm.) 135.5°–136.5° C., $n_D^{30}$ 1.4762.

*Analysis.*—Calculated for $C_{11}H_{23}NO_2S$: N=6.01 percent. Found: N=5.83 percent.

Example X
(R-2255)

When the general procedure of Example III was repeated except that 13.4 g. (0.10 mole) of N-3-chloroallyl-n-propylamine, 10 g. (0.17 mole) of carbonyl sulfide, 10.1 g. (0.10 mole) of triethylamine, 8.1 g. (0.10 mole) of chlorodimethyl ether and 350 cc. of petroleum ether, B.P. 30°–60° C. solvent were employed, there was obtained as a residual liquid after solvent evaporation, 20.3 g. (85.2 percent yield) of methoxymethyl N-3-chloroallyl-N-n-propylthiolcarbamate, $n_D^{30}$ 1.5078. The product could not be distilled at 4.5 mm. without decomposition.

*Analysis.*—Calculated for $C_9H_{16}ClNO_2S$: Cl=14.95 percent; N=5.90 percent. Found: Cl=15.1 percent; N=6.14 percent.

Example XI
(R-2256)

When the general procedure of Example III was repeated except that 25.8 g. (0.20 mole) of di-isobutylamine, 16 g. (0.27 mole) of carbonyl sulfide, 20.2 g. (0.20 mole) of triethylamine, 16.1 g. (0.20 mole) of chlorodimethyl ether and 350 cc. of petroleum ether, B.P. 30°–60° C. solvent were employed, there was obtained 17.6 g. (37.7 percent yield) of methoxymethyl N,N-di-isobutylthiolcarbamate, B.P. (4.6 mm.) 121°–123° C., $n_D^{30}$ 1.4730.

*Analysis.*—Calculated for $C_{11}H_{23}NO_2S$: N=6.01 percent. Found: N=5.87 percent.

Example XII
(R-2686)

A 500 cc. flask was provided with stirrer, thermometer, condenser and gas inlet tube. A solution of 7.3 g. (0.10 mole) of diethylamine and 10.1 g. (0.10 mole) of triethylamine in 150 cc. of tert. butyl alcohol was charged to the flask and then 10 g. (0.17 mole) of carbonyl sulfide was bubbled into the amine solution with rapid stirring, maintaining the temperature between 15°–20° C. with ice cooling. The solution was then heated to 50° C. with slow stirring and 15.3 g. (0.10 mole) of 2-bromethyl ethyl ether was rapidly added. The solution was then maintained at 48°–51° C. for 19 hours without stirring. The reaction mixture was then heated to reflux and 125 cc. of solvent was distilled. The residual slurry was cooled to room temperature, diluted with 200 cc. of petroleum ether, B.P. 30°–60° C., and successively washed with 2–50 cc. portions of water, 2–50 cc. portions of 5% hydrochloric acid and 2–50 cc. portions of water. The organic phase was then dried over anhydrous magnesium sulfate, filtered, and the filtrate was concentrated on the steam bath. The residual liquid was then fractionally distilled through an 18″ Podbielniak heli-grid fractional distillation column. There was obtained 9.0 g. (43.8% yield) of 2-ethoxyethyl N,N-diethylthiolcarbamate, B.P. (10 mm.) 132.5–133.0° C., $n_D^{30}$ 1.4773.

*Analysis.*—Calculated for $C_9H_{19}NO_2S$: N=6.82 percent. Found: N=6.68 percent.

Example XIII
(R-2687)

When the general procedure of Example XII was repeated except that 10.1 g. (0.10 mole) of di-n-propylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained 12.7 g. (54.7% yield) of 2-ethoxyethyl N,N-di-n-propylthiolcarbamate, B.P. (10 mm.) 149.5°–150.0° C., $n_D^{30}$ 1.4734.

Analysis.—Calculated for $C_{11}H_{23}NO_2S$: N=6.00 percent. Found: N=5.79 percent.

Example XIV
(R–2703)

When the general procedure of Example XII was repeated except that 10.1 g. (0.10 mole) of N-ethyl-n-butylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained 11.4 g. (49.1% yield) of 2-ethoxyethyl N-ethyl-N-n-butylthiolcarbamate, B.P. (10 mm.) 151.5°–152.0° C., $n_D^{30}$ 1.4738.

Analysis.—Calculated for $C_{11}H_{23}NO_2S$: N=6.00 percent. Found: N=6.17 percent.

Example XV
(R–2858)

When the general procedure of Example XII was repeated except that 9.7 g. (0.10 mole) of diallylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained 12.4 g. (54.3% yield) of 2-ethoxyethyl N,N-diallylthiolcarbamate, B.P. (10 mm.) 148.5°–149.5° C., $n_D^{30}$ 1.4933.

Analysis.—Calculated for $C_{11}H_{19}NO_2S$: N=6.11 percent. Found: N=5.94 percent.

Example XVI
(R–2862)

When the general procedure of Example XII was repeated except that 8.7 g. (0.10 mole) of N-methyl-n-butylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained 12.9 g. (58.9% yield) of 2-ethoxyethyl N-methyl-N-n-butylthiolcarbamate, B.P. (10 mm.) 147.5°–148.0° C., $n_D^{30}$ 1.4760.

Analysis.—Calculated for $C_{10}H_{19}NO_2S$: N=6.44 percent. Found: N=6.44 percent.

Example XVII
(R–2863)

When the general procedure of Example XII was repeated except that 9.9 g. (0.10 mole) of N-allyl-n-propylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained 14.5 g. (62.8% yield) of 2-ethoxyethyl N-allyl-N-n-propylthiolcarbamate, B.P. (10 mm.) 149.0°–149.5° C., $n_D^{30}$ 1.4836.

Analysis.—Calculated for $C_{11}H_{21}NO_2S$: N=6.05 percent. Found: N=5.78 percent.

Example XVIII
(R–2866)

When the general procedure of Example XII was repeated except that 9.9 g. (0.10 mole) of N-methallylethylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained 14.2 g. (61.5% yield) of 2-ethoxyethyl N-methallyl-N-ethylthiolcarbamate, B.P. (10 mm.) 146.0°–146.5° C., $n_D^{30}$ 1.4848.

Analysis.—Calculated for $C_{11}H_{21}NO_2S$: N=6.05 percent. Found: N=6.13 percent.

Example XIX
(R–2869)

When the general procedure of Example XII was repeated except that 11.1 g. (0.10 mole) of N-methallylallylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohole were employed, there was obtained 15.6 g. (64.1% yield) of 2-ethoxyethyl N-methallyl-N-allylthiolcarbamate, B.P. (10 mm.) 154.0°–155.0° C., $n_D^{30}$ 1.4918.

Analysis.—Calculated for $C_{12}H_{21}NO_2S$: N=5.76 percent. Found: N=5.75 percent.

Example XX
(R–2870)

When the general procedure of Example XII was repeated except that 13.4 g. (0.10 mole) of N-2-chloroallyl-n-propylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained as a residue 18.5 g. (69.6% yield) of 2-ethoxyethyl N-2-chloroallyl-N-n-propylthiolcarbomate, $n_D^{30}$ 1.4949.

Analysis.—Calculated for $C_{11}H_{20}NO_2SCl$: N=5.27 percent; Cl=13.34 percent. Found: N=5.05 percent; Cl=13.31 percent.

Example XXI
(R–2871)

When the general procedure of Example XII was repeated except that 13.2 g. (0.10 mole) of N-2-chloroallyl-allylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained as a residue 17.6 g. (66.7% yield) of 2-ethoxyethyl N-2-chloroallyl-N-allylthiolcarbamate, $n_D^{30}$ 1.5052.

Analysis.—Calculated for $C_{11}H_{18}ClNO_2S$: N=5.31%; Cl=13.44%. Found: N=5.13%; Cl=13.30%.

Example XXII
(R–2872)

When the general procedure of Example XII was repeated except that 13.4 g. (0.10 mole) of N-3-chloroallyl-n-proylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained as a residue 20.5 g. (77.1% yield) of 2-ethoxyethyl N-3-chloroallyl-N-n-propylthiolcarbamate, $n_D^{30}$ 1.4972.

Analysis.—Calculated for $C_{11}H_{20}ClNO_2S$: N=5.27%; Cl=13.34%. Found: N=4.79%; Cl=12.69%.

Example XXIII
(R–2873)

When the general procedure of Example XII was repeated except that 12.7 g. (0.10 mole) of N-ethylcyclohexylamine, 10.1 g. (0.10 mole) of triethylamine, 10 g. (0.17 mole) of carbonyl sulfide, 15.3 g. (0.10 mole) of 2-bromoethyl ethyl ether and 150 cc. of tert. butyl alcohol were employed, there was obtained as a residue 11 g. (42.5% yield) of 2-ethoxyethyl N-ethyl-N-cyclohexylthiolcarbamate, $n_D^{30}$ 1.4983.

Analysis.—Calculated for $C_{13}H_{25}NO_2S$: N=5.40%. Found: N=5.27%.

Example XXIV
(R–2879)

The general procedure of Example XII was repeated except that 14.6 g. (0.20 mole) of diethylamine and 20.2 g. (0.20 mole) of triethylamine in 150 cc. of tert. butyl alcohol was charged to the flask and 16 g. (0.27 mole) of carbonyl sulfide was bubbled into the amine solution. To this reaction mixture was then added dropwise 18.9 g. (0.20 mole) of chloromethyl ethyl ether maintaining the temperature between 20°–30° C. with ice cooling. The reaction mixture was then heated rapidly to reflux and was then worked up in the usual manner. There was obtained 26.4 g. (69.1% yield) of ethoxymethyl N,N-diethylthiolcarbamate, B.P. (10 mm.) 120.0°–120.5° C., $n_D^{30}$ 1.4791.

*Analysis.*—Calculated for $C_8H_{17}NO_2S$: N=7.32 percent. Found: N=7.28 percent.

Example XXV (R–2883)

When the general procedure of Example XXIV was repeated except that 20.2 g. (0.20 mole) of di-n-propylamine, 20.2 g. (0.20 mole) of triethylamine, 16 g. (0.27 mole) of carbonyl sulfide, 18.9 g. (0.20 mole) of chloromethyl ethyl ether and 150 cc. of tert. butyl alcohol were employed, there was obtained 32.2 g. (72.5% yield) of ethoxymethyl N,N-di-n-propylthiolcarbamate, B.P. (10 mm.) 137.5°–138.5° C., $n_D^{30}$ 1.4757.

*Analysis.*—Calculated for $C_{10}H_{21}NO_2S$: N=6.39 percent. Found: N=6.54 percent.

Example XXVI (R–2884)

When the general procedure of Example XXIV was repeated except that 15.2 g. (0.15 mole) of N-ethyl-n-butylamine, 15.2 g. (0.15 mole) of triethylamine, 12.0 g. (0.20 mole) of carbonyl sulfide, 14.2 g. (0.15 mole) of chloromethyl ethyl ether and 150 cc. of tert. butyl alcohol were employed, there was obtained 23.6 g. (71.9% yield) of ethoxymethyl N-ethyl-N-n-butylthiolcarbamate, B.P. (10 mm.) 140.0°–141.0° C., $n_D^{30}$ 1.4756.

*Analysis.*—Calculated for $C_{10}H_{21}NO_2S$: N=6.39 percent. Found: N=6.20 percent.

Example XXVII (R–2894)

When the general procedure of Example XXIV was repeated except that 14.6 g. (0.15 mole) of diallylamine, 15.2 g. (0.15 mole) of triethylamine, 12.0 g. (0.20 mole) of carbonyl sulfide, 14.2 g. (0.15 mole) of chloromethyl ethyl ether and 150 cc. of tert. butyl alcohol were employed, there was obtained 22.3 g. (69.2% yield) of ethoxymethyl N,N-diallylthiolcarbamate, B.P. (10 mm.) 137.5°–138.0° C., $n_D^{30}$ 1.4977.

*Analysis.*—Calculated for $C_{10}H_{17}NO_2S$: N=6.50 percent. Found: N=6.55 percent.

Example XXVIII (R–2896)

When the general procedure of Example XXIV was repeated except that 11.3 g. (0.10 mole) of N-i-butyl-allylamine, 10.1 g. (0.10 mole) of triethylamine, 10 g. (0.17 mole) of carbonyl sulfide, 9.5 g. (0.10 mole) of chloromethyl ethyl ether and 150 cc. of tert. butyl alcohol were employed, there was obtained 15.5 g. (67.2% yield) of ethoxymethyl N-isobutyl-N-allylthiolcarbamate, B.P. (10 mm.) 141.5°–141.8° C., $n_D^{30}$ 1.4829.

*Analysis.*—Calculated for $C_{11}H_{21}NO_2S$: N=6.05 percent. Found: N=6.21 percent.

Example XXIX (R–2898)

When the general procedure of Example XXIV was repeated except that 11.5 g. (0.10 mole) of N-n-butyl-n-propylamine, 10.1 g. (0.10 mole) of triethylamine, 10 g. (0.17 mole) of carbonyl sulfide, 9.5 g. (0.10 mole) of chloromethyl ethyl ether and 150 cc. of tert. butyl alcohol were employed, there was obtained 12.5 g. (53.5% yield) of ethoxymethyl N-n-butyl-N-n-propylthiolcarbamate, B. P. (10 mm.) 147.0°–148.0° C., $n_D^{30}$ 1.4745.

*Analysis.*—Calculated for $C_{11}H_{23}NO_2S$: N=6.00 percent. Found: N=5.87 percent.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots as a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0–100 percent, while growth was reported on a scale of 0–10, based on the seeds which germinated. Thus, 100–10 indicates normal germination and normal growth.

The following data were obtained:

| Compound | Oats | | Cucumbers | | Radish | |
|---|---|---|---|---|---|---|
| | Germ. | Growth | Germ. | Growth | Germ. | Growth |
| R–2686 | 0 | | 0 | | 0 | |
| R–2687 | 0 | | 0 | | 0 | |
| R–2862 | 0 | | 0 | | 0 | |
| R–2703 | 0 | | 0 | | 0 | |
| R–2858 | 0 | | 0 | | 0 | |
| R–2863 | 0 | | 0 | | 0 | |
| R–2866 | 0 | | 0 | | 0 | |
| R–2869 | 0 | | 0 | | 25 | 1 |
| R–2870 | 0 | | 0 | | 50 | 2 |
| R–2871 | 0 | | 0 | | 25 | 1 |
| R–2872 | 0 | | 0 | | 25 | 1 |
| R–2873 | 0 | | 0 | | 50 | 3 |
| R–2879 | 0 | | 0 | | 0 | |
| R–2883 | 0 | | 0 | | 0 | |
| R–2884 | 0 | | 0 | | 0 | |
| R–2898 | 0 | | 0 | | 25 | 1 |
| R–2894 | 0 | | 0 | | 0 | |
| R–2896 | 0 | | 0 | | 15 | 0+ |

The above tests were then repeated using application rates of 10 and 40 pounds per acre with the following results:

| Compound | Lbs./Acre | Peas | | Corn | | Radish | | Oats | | Cucumber | |
|---|---|---|---|---|---|---|---|---|---|---|---|
| | | Ge.[1] | Gr.[2] | Ge. | Gr. | Ge. | Gr. | Ge. | Gr. | Ge. | Gr. |
| R–2686 | 40 | 100 | 6 | 100 | 9 | 100 | 10 | 50 | 0+ | 50 | 3 |
| | 10 | 100 | 10 | 100 | 10 | 100 | 10 | 75 | 1 | 100 | 10 |
| R–2687 | 40 | 75 | 2 | 100 | 9 | 100 | 8 | 0 | | 50 | 3 |
| | 10 | 75 | 5 | 100 | 10 | 100 | 8 | 25 | 0+ | 75 | 6 |
| R–2862 | 40 | 100 | 6 | 100 | 6 | 100 | 6½ | 100 | 1 | 100 | 8 |
| | 10 | 100 | 10 | 100 | 10 | 100 | 10 | 100 | 5 | 100 | 10 |
| R–2703 | 40 | 100 | 3 | 100 | 7½ | 100 | 6½ | 5 | 0+ | 100 | 8 |
| | 10 | 100 | 6 | 100 | 10 | 100 | 9 | 40 | 0+ | 100 | 9½ |
| R–2858 | 40 | 100 | 3 | 100 | 8 | 100 | 6 | 50 | 0+ | 100 | 7 |
| | 10 | 100 | 7½ | 100 | 10 | 100 | 9 | 100 | 1 | 100 | 10 |
| R–2863 | 40 | 100 | 2 | 100 | 9 | 100 | 5 | 100 | 0+ | 100 | 5 |
| | 10 | 100 | 7 | 100 | 10 | 100 | 9 | 100 | 0+ | 100 | 10 |
| R–2866 | 40 | 100 | 3 | 100 | 9 | 100 | 5 | 100 | 0+ | 100 | 6 |
| | 10 | 100 | 8 | 100 | 10 | 100 | 9 | 100 | 1 | 100 | 9 |
| R–2869 | 40 | 100 | 3 | 100 | 7 | 100 | 6 | 25 | 1 | 100 | 5 |
| | 10 | 100 | 8 | 100 | 10 | 100 | 8 | 100 | 3 | 100 | 9 |
| R–2870 | 40 | 100 | 5 | 100 | 6½ | 100 | 6 | 100 | 0+ | 100 | 6 |
| | 10 | 100 | 10 | 100 | 10 | 100 | 10 | 100 | 2 | 100 | 10 |
| R–2871 | 40 | 100 | 6 | 100 | 7 | 100 | 4 | 50 | 2 | 75 | 3½ |
| | 10 | 100 | 9 | 100 | 10 | 100 | 9 | 100 | 3 | 100 | 9 |
| R–2872 | 40 | 100 | 6 | 100 | 5 | 75 | 3 | 20 | 0+ | 100 | 5 |
| | 10 | 100 | 8 | 100 | 9 | 100 | 9 | 100 | 0+ | 100 | 8 |
| R–2873 | 40 | 100 | 4 | 100 | 7 | 100 | 7 | 50 | 0+ | 100 | 8 |
| | 10 | 100 | 8½ | 100 | 10 | 100 | 8 | 100 | 1 | 100 | 10 |
| R–2879 | 40 | 100 | 2 | 100 | 6 | 100 | 5 | 0 | | 50 | 4 |
| | 10 | 100 | 4 | 100 | 8 | 100 | 9 | 20 | 0+ | 100 | 10 |
| R–2883 | 40 | 100 | 2 | 100 | 7 | 50 | 3 | 0 | | 10 | 1 |
| | 10 | 100 | 3 | 100 | 10 | 100 | 9 | 0 | | 100 | 7½ |
| R–2884 | 40 | 100 | 1 | 100 | 4 | 30 | 5 | 0 | | 20 | 5 |
| | 10 | 100 | 4 | 100 | 9 | 100 | 7 | 20 | 0+ | 100 | 8 |
| R–2898 | 40 | 100 | 3 | 100 | 8½ | 100 | 5 | 0 | | 30 | 2 |
| | 10 | 100 | 5 | 100 | 10 | 100 | 8 | 60 | 0+ | 100 | 7 |
| R–2894 | 40 | 100 | 2 | 100 | 9 | 100 | 7 | 100 | 0+ | 0 | |
| | 10 | 100 | 4 | 100 | 10 | 100 | 9 | 100 | 0+ | 40 | 3 |
| R–2896 | 40 | 100 | 3 | 100 | 9 | 100 | 4 | 20 | 0+ | 10 | 1 |
| | 10 | 100 | 5 | 100 | 10 | 100 | 9 | 0 | | 100 | 4 |

[1] Percent Germination.
[2] Growth.

The compounds of the present invention may be used as preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particular advantageous way of applying the compounds is as a narrow band along a row crop, straddling the row.

We claim:

1. The method of combatting weeds comprising: applying a phytotoxic amount to the soil of the compound:

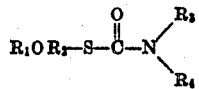

wherein $R_1$ and $R_2$ are selected from lower alkyl radicals and $R_3$ and $R_4$ are selected from the group consisting of lower alkyl, lower alkenyl, cyclohexyl and lower haloalkenyl.

2. The method of claim 1 wherein the compound is applied at the rate of 1 to 500 pounds per acre.

3. The method of claim 1 wherein the compound is methoxymethyl N,N-di-n-propylthiolcarbamate.

4. The method of claim 1 wherein the compound is methoxymethyl N-ethyl-N-n-butylthiolcarbamate.

5. The method of claim 1 wherein the compound is methoxymethyl N-allyl-N-ethylthiolcarbamate.

6. The method of claim 1 wherein the compound is ethoxymethyl N,N-diethylthiolcarbamate.

7. The method of claim 1 wherein the compound is ethoxymethyl N,N-di-n-propylthiolcarbamate.

References Cited in the file of this patent
UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,642,451 | Weijlard et al. | June 16, 1953 |
| 2,687,348 | Kosmin | Aug. 24, 1954 |
| 2,901,500 | Tilles et al. | Aug. 25, 1959 |